United States Patent [19]

Williams

[11] Patent Number: 5,514,222

[45] Date of Patent: May 7, 1996

[54] METHOD FOR CONTROLLING ASBESTOS DUST

[75] Inventor: Thomas H. Williams, Fall Branch, Tenn.

[73] Assignee: Eastman Chemical Company, Kingsport, Tenn.

[21] Appl. No.: 783,721

[22] Filed: Oct. 25, 1991

Related U.S. Application Data

[63] Continuation of Ser. No. 408,853, Sep. 18, 1989, abandoned.

[51] Int. Cl.$^6$ ........................................................ B08B 7/00
[52] U.S. Cl. ................ 134/42; 252/174.21; 252/174.23; 427/154; 427/358
[58] Field of Search ..................... 134/4, 6, 42; 106/169, 106/287.23; 252/174.21, 174.23; 15/209 C; 427/154, 358

[56] References Cited

U.S. PATENT DOCUMENTS

| | | | |
|---|---|---|---|
| 4,347,150 | 8/1982 | Arpin | 252/135 |
| 4,369,203 | 1/1983 | Hansen | 427/10 |
| 4,380,595 | 4/1983 | Arpin | 524/5 |
| 4,383,451 | 5/1983 | Chapel | 73/864 |
| 4,632,847 | 12/1986 | Lomasney et al. | 427/154 |
| 4,693,755 | 9/1987 | Erzinger | 134/4 |
| 4,699,666 | 10/1987 | Tidquist et al. | 134/4 |
| 4,853,042 | 8/1989 | Wilderman, Jr. | 15/209 C |
| 4,971,086 | 11/1990 | Haug et al. | 134/4 |
| 5,108,788 | 4/1992 | Williams | 427/154 |

*Primary Examiner*—Jan H. Silbaugh
*Assistant Examiner*—Saeed Chaudhry
*Attorney, Agent, or Firm*—J. Frederick Thomsen; Harry J. Gwinnell

[57] ABSTRACT

Disclosed is a method for treating asbestos to minimize the formation of airborne particulate of asbestos by applying to the asbestos an aqueous composition containing certain water-dispersible polymers. The method is especially useful when used in conjunction with the removal of asbestos from asbestos-coated objects.

11 Claims, No Drawings

METHOD FOR CONTROLLING ASBESTOS DUST

This is a continuation of copending application Ser. No. 07/408,853 filed on Sep. 18, 1989 now abandoned.

This invention pertains to a method for controlling asbestos dust. More specifically, this invention pertains to the treatment of asbestos-covered objects to minimize airborne particulates of asbestos which occur when the asbestos-covered or coated object is moved, when the asbestos is removed from the object, etc.

Asbestos and asbestos-containing compositions have been widely used in the past as fire-proofing and insulating materials in industrial and public buildings. Such compositions also are commonly used in industrial facilities, especially the chemical process industry, as thermal insulation for pipes, reactors and similar equipment. Over a period of time the asbestos in these compositions becomes friable resulting in the formation of small particles of asbestos which can be entrained in the atmosphere. The inhalation of these small particles is known to cause asbestosis which may lead to lung cancer. The severe health hazard represented by the presence of asbestos-containing coatings has required the widespread removal thereof. However, the mechanical denudation of asbestos compositions from substrates normally aggravates the problem of airborne particulate asbestos. The nature and extent of this problem and several measures which have been proposed in response thereto are described in U.S. Pat. Nos. 4,693,755 and 4,699,666.

I have discovered that the amount of particulate asbestos created by the mechanical denudation of objects coated with asbestos-containing materials can be reduced substantially by applying to such materials an aqueous composition comprising water and certain water-dispersible polymers. These polymers are polyesters and polyesteramides which are characterize by the presence of alkali metal sulfonate groups on the polymer chains. The method provided by this invention thus comprises applying an aqueous composition containing a water-dispersible polymer having alkali metal sulfonate groups bonded thereto to an asbestos-containing material to inhibit the formation of particulate asbestos, e.g., asbestos fibers. The aforesaid compositions do not contain any hazardous or flammable chemicals, exhibit good penetration of asbestos materials and are relatively fast drying. Upon drying on the asbestos, the polyesters and polyesteramides are flexible and exhibit excellent adherence to the asbestos due to an ion exchange mechanism between the alkali sulfonate groups and the magnesium ions of the asbestos.

The water-dispersible polymers useful according to my invention are described in U.S. Pat. Nos. 3,734,874, 3,779,993, 4,233,196 and 4,335,220, the disclosures of which are incorporated herein by reference. These polymers are, for the most part, water-dispersible because they form electrostatically-stabilized colloids when mixed with water. The colloid particle size varies with the polymer composition but has been shown by light diffraction studies and transmission electron microscopy (on fresh films) to be mostly 200–800 Å in diameter. The aqueous colloid dispersions exhibit a minimum precipitation of solid material with time, in the temperature range of 0.1°–99.9° C. because the relationship between the particle densities and viscosities (very similar to those of water when concentrations are less than 30 weight percent) are such that thermal energy expressed as Brownian motion is sufficient to keep the particles suspended in water.

The water-dispersible polymers are characterized by an inherent viscosity, determined at 25° C. using 0.25 g polymer per 100 mL of a solvent consisting of 60 parts by weight phenol and 40 parts by weight tetrachloroethane, of at least 0.1 dL/g and are comprised of:

(i) residues of at least one dicarboxylic acid;
(ii) about 4 to 25 mole percent, based on the total of all acid, hydroxy and amino equivalents, of residues of at least one difunctional sulfo monomer containing at least one sulfonate group bonded to an aromatic ring wherein the functional groups are hydroxy, carboxyl or amino;
(iii) residues of at least one diol or a mixture of a diol and a diamine comprising:
 (a) at least 15 mole percent, based on the total mole percent of diol residues or diol and diamine residues, of a diol having the formula $-(-OCH_2CH_2-)_n-$ wherein n is 2 to about 20, or
 (b) about 0.1 to less than about 15 mole percent, based on the total mole percent of diol residues or diol and diamine residues, of residues of a poly(ethylene glycol) having the formula $-(-OCH_2CH_2-)_n-$ wherein n is 2 to about 500, provided that the mole percent of such residues is inversely proportional to the value of n; and, optionally,
(iv) residues of at least one difunctional monomer reactant selected from hydroxycarboxylic acids, aminocarboxylic acids and aminoalkanols; provided that at least 20 percent of the groups linking the monomeric units are ester, i.e., carbonyloxy, linkages.

The water-dispersible polymers thus comprise polyesters and polyesteramides consisting of repeating, alternating residues of (1) one or more dicarboxylic acids and (2) one or more diols or a combination of one or more diols and one or more diamines wherein, in the preceding definition, the mole percentages are based on 100 mole percent dicarboxylic acid residues and 100 mole percent diol or diol and diamine residues. Alternatively, the polymers may include residues of monomers having mixed functionality such as hydroxycarboxylic acids, aminocarboxylic acids and/or aminoalkanols.

In the above definition of the water-dispersible polymers, the term "residue" refers to the remainder or reaction product of dicarboxylic acid (i), difunctional sulfo monomer (ii), diol or diol and diamine (iii), and difunctional monomer (iv) when those components are reacted or condensed according to conventional interchange and polymerization processes.

The residues of component (i) may be derived from one or more dicarboxylic acids or their ester forming derivatives such as dialkyl esters, bis(hydroxyalkyl) esters, acid chlorides or, in some cases, anhydrides. The sulfonate group of component (ii) may be an alkali metal sulfonic salt such as lithium, potassium or, especially, sodium sulfonate groups.

The concentration of the above-described polymeric material in the aqueous compositions suitable for carrying out my invention may be varied depending on several factors such as the particular polymer used, the equipment from which the composition will be applied, the nature and position of the asbestos to be treated, etc. Normally, the concentration of the water-dispersible polymer will be at least 5 weight percent based on the total weight of the aqueous composition with concentrations in the range of about 10 to 40 weight percent being more common.

The aqueous compositions may contain other compounds to promote the drying, penetration and/or visualization thereof. Examples of such compounds include alcohols such as ethanol, propanol and 2-propanol; conventional surface-active agents; and colorants such as Color Index Pigment Yellow 1, 3, 4, 5, 10, 12, 13, 14, 15, 16, 17, 55, 60, 73, 74, 75 and 83 as well as C.I. Pigment Orange 1, 14 and 15. While not preferred, the aqueous compositions also may contain minor amounts, e.g., up to about 5 weight percent, of another polymeric material.

The preferred water-dispersible polymer is a polyester having an inherent viscosity of about 0.28 to 0.38 dL/g comprised of:

(i) diacid residues comprising about 75 to 84 mole percent isophthalic acid residues and about 16 to 25 mole percent 5-sodiosulfoisophthalic acid residues; and (ii) diol residues comprising about 45 to 60 mole percent diethylene glycol residues and about 40 to 55 mole percent ethylene glycol, 1,4-cyclohexanedimethanol or mixtures thereof, wherein the term "residues" refers to the remainder or reaction product of isophthalic acid and 5-sodiosulfoisophthalic acid (i) and diethylene glycol and ethylene glycol (ii) when those components are reacted or condensed according to conventional interchange and polymerization processes.

Specific embodiments of these water-dispersible polymers are available from Eastman Chemical Products, Inc. in the form of pellets (EASTMAN AQ 29S Polymer, EASTMAN 38S Polymer and EASTMAN 55S Polymer) and in the form of aqueous dispersions (EASTMAN AQ 29D Polymer, EASTMAN 38D Polymer and EASTMAN 55D Polymer).

The aqueous compositions may be applied to asbestos by any conventional coating means using a brush, sprayer, roller and similar equipment. The most suitable means for applying the compositions depends on the position and location of the asbestos or asbestos-coated object to be treated. The sprayability of the above-described aqueous compositions is an especially advantageous feature of my invention since it permits application of the aqueous compositions over a shorter period of time with less labor costs. The sprayability of the compositions also permits their application to asbestos present at relatively inaccessible points or locations. After the aqueous composition has been applied and permitted to partially or completely dry, the treated asbestos may be removed by conventional methods, i.e., by mechanical denuding. In some cases, as the asbestos is removed, for example from a pipe, additional spraying of the inside area of the asbestos as it is exposed with the aqueous composition can minimize further the formation of asbestos dust.

The method provided by this invention may be utilized in conjunction with the removal of asbestos as described or it may be used to render non-hazardous asbestos coatings which are not to be removed immediately. When the aqueous composition is applied and allowed to dry, the water-dispersible polymer forms a film or coating which binds the friable asbestos fibers, i.e., locks the asbestos down, thereby preventing the release of any asbestos dust. When the aqueous composition is applied in conjunction with asbestos removal, the composition typically is applied in an amount which is sufficient to achieve a penetration of about 1.8 inches. The amount of aqueous composition required for a given area of asbestos will vary considerably depending upon a number of factors such as the type, condition, permeability and thickness of the asbestos, the concentration of the water-dispersible polymer in the aqueous composition, etc. Maximum penetration may require a plurality of applications of the aqueous composition with the second coating (and any subsequent coatings) being applied before the previous coat is allowed to dry. When the aqueous compositions are applied to asbestos which is to be allowed to remain in place for some period of time (commonly referred to as encapsulation), the depth to which the composition penetrates the asbestos typically is in the range of about 0.5 to 0.8 inches.

The method provided by this invention is further illustrated by the following examples.

EXAMPLE 1

An aqueous composition (0.5 gallon, 1.89 L) comprising EASTMAN AQ 29D dispersed polymer (30 weight percent in water) and 1.5 weight percent C. I. Pigment Yellow-14 was sprayed on a 4 foot by 20 foot (1.22 X 6.10 m) section of two-inch (50.8 mm) thick asbestos coated on a boiler using a garden sprayer and an application time of about 30 minutes. The aqueous composition dried on the asbestos in about 10 minutes. The application of the aqueous composition initially was intended only to encapsulate or coat the asbestos insulation to prevent the formation of airborne asbestos dust. Two days after the application, the support wires were removed and then the asbestos coating was removed with the application of additional aqueous composition to the backside of the asbestos as it was exposed. The aqueous composition initially applied penetrated the asbestos coating to a depth of 0.25 to 0.5 inches (6.35–12.7 mm) and the water-dispersible polymer formed a pliable coating on the asbestos and filled cracks present in the asbestos coating. No asbestos dust was observed during the removal of the asbestos.

EXAMPLE 2

The aqueous composition described in Example 1 (1.5 quarts, 1.42 L) was sprayed in two coats (about 10 minutes between the application of each coat) over a total period of 20 minutes to a 3 foot by 12 foot (0.91 ×3.64 m) section of a two inch (50.8 mm) thick asbestos coating on an air duct. The asbestos coating then was removed as described in Example 1 without the formation of asbestos dust.

EXAMPLE 3

The aqueous composition employed in Example 1 (1 gallon, 3.79 L) was diluted with water (2 gallons, 7.8 L) and the resulting composition was sprayed on eight insulated lines 20 feet (6.1 m) in length consisting of 2.5 inch (65 mm) diameter pipe surrounded with a three inch (75 mm) thick coating of asbestos. The metal support wires were removed and the asbestos was mechanically denuded from the pipes with the application of additional aqueous composition to the backside of the asbestos coatings as it was exposed. The aqueous composition had penetrated the asbestos to a depth of approximately 1.8 inches (38 mm) and prevented the formation of any asbestos dust during the removal process.

The invention has been described in detail with particular reference to preferred embodiments thereof, but it will be understood that variations and modifications may be effected within the spirit and scope of the invention.

I claim:

1. Method for the treatment of asbestos-coated objects to minimize airborne particulates of asbestos which comprises applying to the asbestos a particulate-inhibiting amount of a composition comprising water and a water-dispersible polymer wherein the polymer has an inherent viscosity of at least 0.1 dL/g, determined at 25° C. using 0.25 g polymer per 100 mL of a solvent consisting of 60 parts by weight phenol and 40 parts by weight tetrachloroethane, wherein said polymer comprises:

(i) residues of at least one dicarboxylic acid;

(ii) about 4 to 25 mole percent, based on the total of all acid, hydroxy, and amino equivalents, of residues of at least one difunctional sulfo monomer containing at least one sulfonate group bonded to an aromatic ring wherein the functional groups are hydroxy, carboxyl, or amino;

(iii) residues of at least one diol or a mixture of a diol and a diamine comprising:

(a) at least 15 mole percent, based on the total mole percent of diol residues or diol and diamine residues, of a diol having the formula $-(-OCH_2CH_2-)_n-$ wherein n is 2 to about 20, or (b) about 0.1 to less than 15 mole percent, based on the total mole percent of diol residues or diol and diamine residues, of residues of a poly(ethylene glycol) having the formula $-(-OCH_2CH_2-)_n-$ wherein n is 2 to about 500; provided that the mole percent of such residues is inversely proportional to the value of n;

and, optionally, (iv) residues of at least one difunctional monomer reactant selected from the group consisting of hydroxycarboxylic acids, aminocarboxylic acids, and aminoalkanols;

provided that at least 20 percent of the groups linking the monomeric units are ester linkages and wherein the term residues refers to the remainder or reaction product of dicarboxylic acid (i), difunctional sulfo monomer (ii), diol or diol and diamine (iii), and difunctional monomer (iv) when those components are reacted or condensed according to interchange and polymerization processes.

2. The method of claim 1 wherein the composition comprises about 10 to 40 weight percent, based on the total weight of the composition, of the water-dispersible polymer.

3. The method of claim 1 wherein the composition comprises a colorant and about 10 to 40 weight percent, based on the total weight of the composition, of the water-dispersible polymer.

4. The method of claim 1 wherein the composition comprises water and about 10 to 40 weight percent, based on the total weight of the composition, of a water-dispersible polymer having an inherent viscosity of about 0.28 to 0.38 dL/g comprised of:

(i) diacid residues comprising about 75 to 84 mole percent isophthalic acid residues and about 16 to 25 mole percent 5-sodiosulfoisophthalic acid residues; and (ii) diol residues comprising about 45 to 60 mole percent diethylene glycol residues and about 40 to 55 mole percent ethylene glycol, 1,4-cyclohexanedimethanol or mixtures thereof.

5. The method of claim 4 wherein the composition contains a colorant.

6. Method for removing asbestos from an asbestos-coated object while minimizing the formation of airborne asbestos particulates which comprises the steps of:

I. applying to the asbestos a particulate-inhibiting amount of a composition comprising water and a water-dispersible polymer wherein the polymer has an inherent viscosity of at least 0.1 dL/g, determined at 25° C. using 0.25 g polymer per 100 mL of a solvent consisting of 60 parts by weight phenol and 40 parts by weight tetrachloroethane, said polymer comprising:

(i) residues of at least one dicarboxylic acid;

(ii) about 4 to 25 mole percent, based on the total of all acid, hydroxy and amino equivalents, of residues of at least one difunctional sulfo monomer containing at least one sulfonate group bonded to an aromatic ring wherein the functional groups are hydroxy, carboxyl, or amino;

(iii) residues of at least one diol or a mixture of a diol and a diamine comprising:

(a) at least 15 mole percent, based on the total mole percent of diol residues or diol and diamine residues, of a diol having the formula $-(-OCH_2CH_2-)_n-$ wherein n is 2 to about 20, or (b) about 0.1 to less than 15 mole percent, based on the total mole percent of diol residues or diol and diamine residues, of residues of a poly(ethylene glycol) having the formula $-(-OCH_2CH_2-)_n-$ wherein n is 2 to about 500, provided that the mole percent of such residues is inversely proportional to the value of n; and, optionally, (iv) residues of at least one difunctional monomer reactant selected from the group consisting of hydroxycarboxylic acids, aminocarboxylic acids and aminoalkanols;

provided that at least 20 percent of the groups linking the monomeric units are ester linkages and wherein the term residues refers to the remainder or reaction product of dicarboxylic acid (i), difunctional sulfo monomer (ii), diol or diol and diamine (iii), and difunctional monomer (iv) when those components are reacted or condensed according to interchange and polymerization processes; and II. removing the asbestos.

7. Method according to claim 6 wherein the composition comprises about 10 to 40 weight percent, based on the total weight of the composition, of the water-dispersible polymer.

8. Method according to claim 6 wherein the composition comprises a yellow colorant and about 10 to 40 weight percent, based on the total weight of the composition, of the water-dispersible polymer.

9. Method for removing asbestos from an asbestos-coated object while minimizing the formation of airborne asbestos particulates which comprises the steps of:

I. applying to the asbestos a particulate inhibiting amount of a composition comprising water and a water-dispersible polymer wherein the polymer has an inherent viscosity of about 0.28 to 0.38 dL/g, wherein said polymer comprises:

(i) diacid residues comprising about 75 to 84 mole percent isophthalic acid residues and about 16 to 25 mole percent 5-sodiosulfoisophthalic acid residues; and (ii) diol residues comprising about 45 to 60 mole percent diethylene glycol residues and about 40 to 55 mole percent ethylene glycol, 1,4-cyclohexanedimethanol or mixtures thereof , wherein the term residues refers to the remainder or reaction product of isophthalic acid and 5-sodiosulfoisophthalic acid (i) and diethylene glycol and ethylene glycol (ii) when those components are reacted or condensed according to interchange and polymerization processes;

II. allowing the composition to dry on the asbestos; and

III. mechanically removing the composition-treated asbestos.

10. Asbestos having coated thereon a water-dispersible polymer having an inherent viscosity of at least 0.1 dL/g, determined at 25° C. using 0.25 g polymer per 100 mL of a solvent consisting of 60 parts by weight phenol and 40 parts by weight tetrachloro-ethane, wherein said polymer comprises:

(i) residues of at least one dicarboxylic acid;

(ii) about 4 to 25 mole percent, based on the total of all acid, hydroxy and amino equivalents, of residues of at least one difunctional sulfo monomer containing at least one sulfonate group bonded to an aromatic ring wherein the functional groups are hydroxy, carboxyl or amino;

(iii) residues of at least one diol or a mixture of a diol and a diamine comprising:

(a) at least 15 mole percent, based on the total mole percent of diol residues or diol and diamine residues, of a diol having the formula $-(-OCH_2CH_2-)_n-$ wherein n is 2 to about 20, or (b) about 0.1 to less than 15 mole percent, based on the total mole percent of diol residues or diol and diamine residues, of residues of a poly(ethylene glycol) having the formula $-(-OCH_2CH_2-)_n-$ wherein n is 2 to about 500, provided that the mole percent of such residues is inversely proportional to the value of n;

and, optionally, (iv) residues of at least one difunctional monomer reactant selected from the group consisting of hydroxycarboxylic acids, aminocarboxylic acids and aminoalkanols;

provided that at least 20 percent of the groups linking the monomeric units are ester linkages and wherein the term residues refers to the remainder or reaction product of dicarboxylic acid (i), difunctional sulfo monomer (ii), diol or diol and diamine (iii), and, difunctional monomer (iv) when those components are reacted or condensed according to interchange and polymerization processes.

11. Asbestos according to claim 10 having a coating of a water-dispersible polymer having an inherent viscosity of about 0.28 to 0.38 dL/g comprised of:

(i) diacid residues comprising about 75 to 84 mole percent isophthalic acid residues and about 16 to 25 mole percent 5-sodiosulfoisophthalic acid residues; and (ii) diol residues comprising about 45 to 60 mole percent diethylene glycol residues and about 40 to 55 mole percent ethylene glycol, 1,4-cyclohexanedimethanol or mixtures thereof.

* * * * *